US008521822B2

(12) United States Patent
Tu

(10) Patent No.: US 8,521,822 B2
(45) Date of Patent: Aug. 27, 2013

(54) RECIPIENT CHANGE NOTIFICATION

(75) Inventor: Van Quy Tu, Kitchener (CA)

(73) Assignee: BlackBerry Limited, Waterloo, Ontario ( * ) Notice: Subject to any disclaimer, the term of this patent is extended or adjusted under 35 U.S.C. 154(b) by 416 days.

(21) Appl. No.: 12/842,212

(22) Filed: Jul. 23, 2010

(65) Prior Publication Data
US 2012/0023174 A1    Jan. 26, 2012

(51) Int. Cl.
*G06F 15/16* (2006.01)

(52) U.S. Cl.
USPC .......................................................... 709/206

(58) Field of Classification Search
USPC ................................................. 709/206, 207
See application file for complete search history.

(56) References Cited

U.S. PATENT DOCUMENTS

| | | | |
|---|---|---|---|
| 5,968,119 A * | 10/1999 | Stedman et al. | 709/219 |
| 6,081,837 A * | 6/2000 | Stedman et al. | 709/219 |
| 6,088,717 A | 7/2000 | Reed et al. | |
| 6,201,814 B1 | 3/2001 | Greenspan | |
| 6,484,196 B1 | 11/2002 | Maurille | |
| 6,671,718 B1 * | 12/2003 | Meister et al. | 709/206 |
| 6,725,228 B1 * | 4/2004 | Clark et al. | 1/1 |
| 6,892,196 B1 * | 5/2005 | Hughes | 707/754 |
| 7,035,903 B1 * | 4/2006 | Baldonado | 709/206 |
| 7,334,020 B2 * | 2/2008 | Caughey | 709/206 |
| 7,421,690 B2 * | 9/2008 | Forstall et al. | 718/100 |
| 7,457,842 B2 * | 11/2008 | Heilmann | 709/206 |
| 7,716,593 B2 * | 5/2010 | Durazo et al. | 715/752 |
| 7,814,155 B2 * | 10/2010 | Buchheit et al. | 709/206 |
| 2001/0042098 A1 * | 11/2001 | Gupta et al. | 709/206 |
| 2001/0042100 A1 * | 11/2001 | Guedalia et al. | 709/206 |
| 2002/0023138 A1 | 2/2002 | Quine et al. | |
| 2002/0099775 A1 | 7/2002 | Gupta et al. | |
| 2002/0194278 A1 | 12/2002 | Golan | |
| 2003/0005058 A1 | 1/2003 | Sorotzkin | |
| 2003/0101065 A1 * | 5/2003 | Rohall et al. | 705/1 |
| 2003/0120737 A1 | 6/2003 | Lytle et al. | |
| 2003/0131060 A1 | 7/2003 | Hartselle et al. | |
| 2003/0163537 A1 * | 8/2003 | Rohall et al. | 709/206 |
| 2003/0167310 A1 * | 9/2003 | Moody et al. | 709/206 |
| 2003/0233419 A1 * | 12/2003 | Beringer | 709/206 |
| 2004/0044735 A1 * | 3/2004 | Hoblit | 709/206 |

(Continued)

FOREIGN PATENT DOCUMENTS

| WO | 2005079023 A1 | 8/2005 |
|---|---|---|
| WO | 2007033464 A1 | 3/2007 |

OTHER PUBLICATIONS

EPO, Extended European Search Report, relating to application No. 10170667.9 dated Dec. 23, 2010.

(Continued)

*Primary Examiner* — Sargon Nano
(74) *Attorney, Agent, or Firm* — Ridout & Maybee LLP

(57) ABSTRACT

An electronic communication device may, perhaps with the assistance of a mobile device server, determining that a new electronic message received by the device is part of a message thread that includes the new message and at least one prior electronic message previously received at the device. A comparison may be made of address information of the new message with address information of the at least one prior electronic message in the message thread to determine that there has been a change in addressed recipients between the new message and the at least one prior electronic message. The device may then notify a user of the device of the change.

8 Claims, 11 Drawing Sheets

(56) References Cited

U.S. PATENT DOCUMENTS

| | | | |
|---|---|---|---|
| 2004/0059784 A1* | 3/2004 | Caughey | 709/206 |
| 2004/0103162 A1 | 5/2004 | Meister et al. | |
| 2004/0199589 A1* | 10/2004 | Keohane et al. | 709/206 |
| 2004/0254989 A1* | 12/2004 | Baratakke et al. | 709/206 |
| 2004/0260756 A1 | 12/2004 | Forstall et al. | |
| 2005/0004990 A1* | 1/2005 | Durazo et al. | 709/206 |
| 2005/0117715 A1* | 6/2005 | Bordia | 379/88.13 |
| 2005/0132066 A1 | 6/2005 | Heilmann | |
| 2005/0149621 A1 | 7/2005 | Kirkland et al. | |
| 2005/0177621 A1 | 8/2005 | Moody et al. | |
| 2005/0188031 A1 | 8/2005 | Zandt | |
| 2005/0198143 A1 | 9/2005 | Moody et al. | |
| 2005/0223063 A1 | 10/2005 | Chang et al. | |
| 2005/0278430 A1 | 12/2005 | Cato | |
| 2006/0161849 A1* | 7/2006 | Miller et al. | 715/744 |
| 2006/0212522 A1 | 9/2006 | Walter | |
| 2006/0259557 A1 | 11/2006 | Lin et al. | |
| 2007/0067394 A1 | 3/2007 | Adams et al. | |
| 2007/0073871 A1* | 3/2007 | Adams et al. | 709/224 |
| 2007/0217408 A1 | 9/2007 | Sahashi et al. | |
| 2008/0120410 A1* | 5/2008 | Quoc et al. | 709/225 |

OTHER PUBLICATIONS

EPO, Extended European Search Report, relating to application No. 05108546.2 dated Dec. 22, 2005.

EPO, Extended European Search Report, relating to application No. 06761115.2 dated Aug. 17, 2009.

P. Resnick, Internet Message Format, Network Working Group, Qualcomm Incorporated, Apr. 2001.

Internation Searching Authority, PCT Written Opinion and International Search Report relating to International Application No. PCT/CA2006/001153 dated Oct. 23, 2006.

USPTO, Office Action relating to U.S. Appl. No. 11/227,607 dated Sep. 2, 2010.

* cited by examiner

RECIPIENT CHANGE NOTIFICATION

FIELD

The present application relates to messaging applications that send and receive messages and, in particular, to recipient change notification.

BACKGROUND

In the context of communications over the Internet, the term thread originally referred to a chain of postings on a single subject in a newsgroup. More recently however, the term thread has come to also mean a particular series (or set) of messages derived or continued on from an original message. One example of a common usage of the term thread is in the context of office communications where a set of these related messages may have been created, and then someone will forward the thread to a person not on the original distribution list with perhaps the top message stating, "be sure to follow this thread to get the background information on it."

It is possible that during a message thread additional recipients (previously absent from the thread) are added. It may not be clear to the other recipients that these additional recipients have been added. If so, unintended actions might end up being taken. For example, one of the message recipients might send out a reply containing information that he did not wish the additional recipients to see. Of course the additional recipients might not be internal recipients (i.e., people who work in the same company as the individuals who received the message that started the thread). Therefore one possible consequence of not being made aware of additional recipients might be the causing of a leak of confidential information.

Alternatively, sometimes during a message thread certain recipients are taken out of one or more of the most recent messages. Again it may not be clear to the other recipients that these recipients have been removed. Later, as additional messages are sent, there may be confusion as to why certain removed recipients never received particular messages intended to be sent to them.

Accordingly, it would be advantageous to improve methods and systems for detection and notification of a change in message recipients.

BRIEF DESCRIPTION OF THE DRAWINGS

Reference will now be made, by way of example, to the accompanying drawings which show example implementations; and in which.

Similar reference numerals may have been used in different figures to denote similar components.

DETAILED DESCRIPTION

Figure 1:
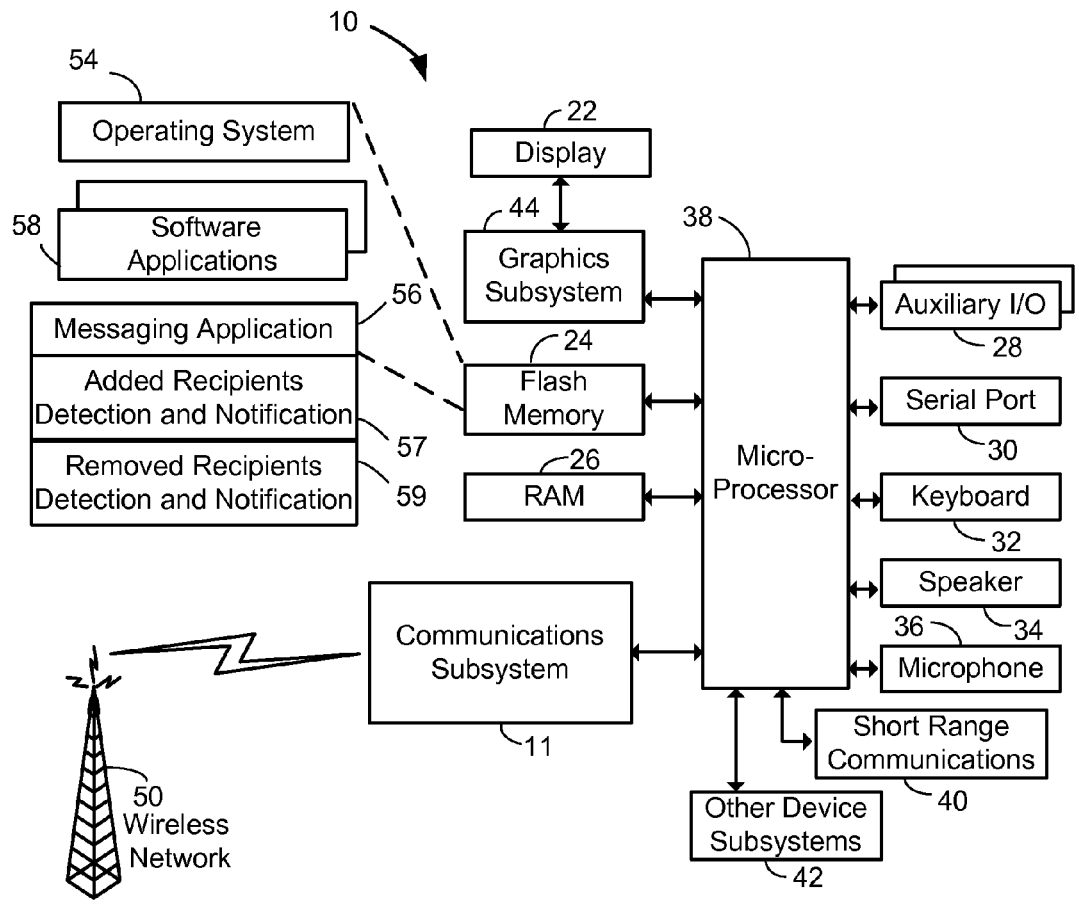
FIG. 1 shows a block diagram of an example of a user device to which example embodiments can be applied.

An electronic communication device may, perhaps with the assistance of a mobile device server, determining that a new electronic message received by the device is part of a message thread that includes the new message and at least one prior electronic message previously received at the device. A comparison may be made of address information of the new message with address information of the at least one prior electronic message in the message thread to determine that there has been a change in addressed recipients between the new message and the at least one prior electronic message. The device may then notify a user of the device of the change.

According to an aspect of the present disclosure, there is provided a changed recipient indication method. The method includes receiving, from a server, a new message having an incomplete list of recipient addresses, the new message identifiable as belonging to a common thread, determining that the list of recipient addresses is incomplete, responsive to the determining, transmitting a request, to the server, for a complete list of recipients and receiving a response from the server, the response including the complete list of recipients. The method further includes processing the complete list of recipients to detect that the new message includes a change in recipient addresses relative to at least one message in the set of messages in the thread, receiving a request to display the new message and notifying, responsive to the receiving the request to display, that the new message includes the change in recipient addresses. In other aspects of the present application, a electronic communications device is provided including a processor capable of carrying out this method and a computer readable medium is provided for adapting a processing apparatus to carry out this method.

According to an aspect of the present disclosure, there is provided a changed recipient indication method. The method includes receiving, from a server, a new message having an incomplete list of recipient addresses, the new message identifiable as belonging to a common thread, transmitting a request, to the server, for recipient change processing, receiving a response from the server, the response including an indication of a change in recipient addresses and notifying, responsive to the receiving the response, that the new message includes the change in recipient addresses. In other aspects of the present application, a electronic communications device is provided including a processor capable of carrying out this method and a computer readable medium is provided for adapting a processing apparatus to carry out this method.

According to an aspect of the present disclosure, there is provided a changed recipient indication method. The method includes receiving, from an electronic communications device, a request for changed recipient notification for a given message, the given message identifiable as belonging to a common thread, processing the request, responsive to the processing, generating a recipient change response, the recipient change response including an indication of a change in recipient addresses and transmitting, to the electronic communications device, the recipient change response. In other aspects of the present application, a mobile device server is provided with processor for carrying out this method and a computer readable medium is provided for adapting a processor to carry out this method.

Other aspects and features of the present disclosure will become apparent to those of ordinary skill in the art upon review of the following description of specific embodiments of the disclosure in conjunction with the accompanying figures.

The following description of example embodiments does not limit contemplated implementations to any particular computer programming language or system architecture. Changed recipients detection and notification in accordance with the disclosure is not limited to any particular operating system, mobile device architecture, or computer programming language. Moreover, although some of the embodiments described below include mobile devices, changed recipients detection and notification in accordance with the disclosure is not limited to mobile devices; rather, it may be embodied within a variety of user devices or terminals, including handheld devices, mobile telephones, personal digital assistants (PDAs), personal computers, audio-visual terminals, interactive television terminals, and other devices. One skilled in the art will appreciate that messaging applications can be installed on most of these user devices and terminals.

Any references herein to "messages" are not intended to be limited to e-mail, but should be understood to include other types of electronic messages that one skilled in the art would understand to be possible in the context in which the term is being used. Other types of messages include text messages, audio messages, video messages, and other items, including calendar entries, tasks, and other date-related items that can be sent to and received by addressed recipients.

FIG. 1 illustrates a mobile communication device 10 as an example of a device that may implement the present disclosure. The mobile communication device 10 includes a housing, an input device (e.g., a keyboard 32 having a plurality of keys) and an output device (e.g., a display 22), which may comprise a full graphic, or full color, Liquid Crystal Display (LCD). In some embodiments, the display 22 may comprise a touchscreen display. In such embodiments, the keyboard 32 may comprise a virtual keyboard. Other types of output devices may alternatively be utilized. A processing device (a microprocessor 38) is shown schematically in FIG. 4 as coupled between the keyboard 32 and the display 22. The microprocessor 38 controls the operation of the display 22, via a graphics subsystem 44, as well as the overall operation of the mobile communication device 10, in part, responsive to actuation of the keys on the keyboard 32 by a user. The graphics subsystem 44 may interact with the display 22 to render graphics and/or text upon the display 22.

The housing may be elongated vertically, or may take on other sizes and shapes (including clamshell housing structures). In the case in which the keyboard 32 includes keys that are associated with at least one alphabetic character and at least one numeric character, the keyboard 32 may include a mode selection key, or other hardware or software, for switching between alphabetic entry and numeric entry.

In addition to the microprocessor 38, other parts of the mobile communication device 10 are shown schematically in FIG. 1. These may include a communications subsystem 11, a short-range communications subsystem 40, the keyboard 32 and the display 22. The mobile communication device 10 may further include other input/output devices, such as a set of auxiliary I/O devices 28, a serial port 30, a speaker 34 and a microphone 36. The mobile communication device 10 may further include memory devices including a flash memory 24 and a Random Access Memory (RAM) 26 and various other device subsystems 42. The mobile communication device 10 may comprise a two-way radio frequency (RF) communication device having voice and data communication capabilities. In addition, the mobile communication device 10 may have the capability to communicate with other computer systems via the Internet.

Operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The serial port 30 of FIG. 1, which may be a universal serial bus (USB) port, would normally be implemented in a personal digital assistant (PDA)-type communication device for which synchronization with a user's desktop computer (not shown) may be desirable, but is an optional device component. Such a port 30 would enable preferences to be set through an external device or software application and would extend the capabilities of the device by providing for information or software downloads to the device 10 other than through a wireless communication network.

Operating system software executed by the microprocessor 38 may be stored in a computer readable medium, such as the flash memory 24, but may be stored in other types of memory devices, such as a read only memory (ROM) or similar storage element. In addition, system software, specific device applications, or parts thereof, may be temporarily loaded into a volatile store, such as the RAM 26. Communication signals received by the mobile device may also be stored to the RAM 26.

The microprocessor 38, in addition to its operating system functions, enables execution of software applications 58 on the mobile communication device 10. A predetermined set of software applications 58 that control basic device operations, such as a voice communications module and a data communications module, may be installed on the mobile communication device 10 during manufacture.

Figure 2:
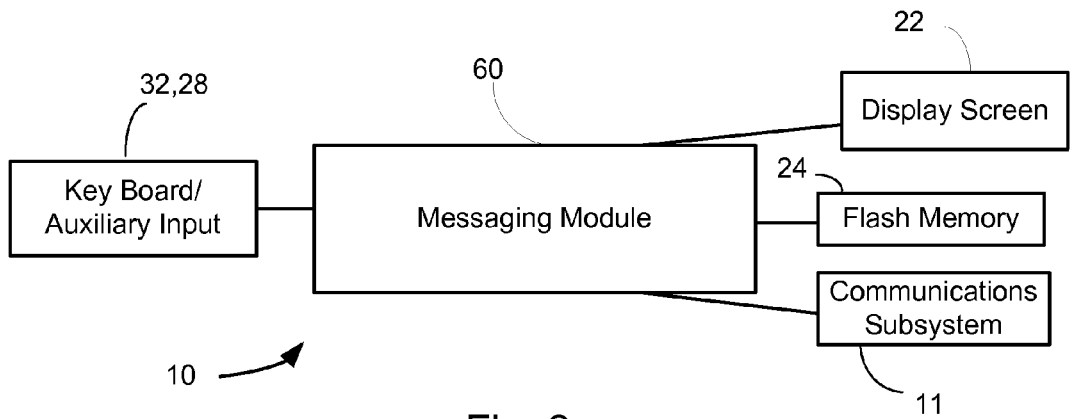
FIG. 2 shows a further block diagram representation of the user device of FIG. 1.

In one embodiment, the software resident on the device 10 includes a messaging application 56. Under instructions from the messaging application 56 resident on the device 10, the processor 38 is configured to implement a messaging module 60, represented in FIG. 2, for interacting with various device subsystems described above for permitting actions to be taken in relation to messages, and more specifically messages or other items, such as tasks, calendar items, etc., can be sent, received and displayed. In some embodiments, some or part of the functionality of the messaging module 300 can be implemented through firmware or hardware components instead of, or in combination with, computer software instructions executed by the microprocessor 38 (or other processors).

As well, additional software modules, which may include, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 50 represented by a radio tower. The data items managed by the PIM application may be seamlessly integrated, synchronized and updated via the wireless carrier network 50 with the device user's corresponding data items stored or associated with a host computer system.

Communication functions, including data and voice communications, are performed through the communication subsystem 11 and, possibly, through the short-range communications subsystem 40. The communication subsystem 11 may include a receiver, a transmitter and one or more antennas, such as a receive antenna and a transmit antenna. In addition, the communication subsystem 11 may also include a processing module, such as a digital signal processor (DSP), and local oscillators. The specific design and implementation of the communication subsystem 11 is dependent upon the communication network in which the mobile communication device 10 is intended to operate. For example, the communication subsystem 11 of the mobile communication device 10 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the mobile communication device 10.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 10 may send and receive communication signals over the wireless carrier network 50. Signals received from the wireless carrier network 50 by the receive antenna are routed to the receiver, which provides for signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the wireless carrier network 50 are processed (e.g., modulated and encoded) by the DSP and are then provided to the transmitter for digital to analog conversion, frequency up conversion, filtering, amplification and transmission to the wireless carrier network 50 (or networks) via the transmit antenna.

In addition to processing communication signals, the DSP provides for control of the receiver and the transmitter. For example, gains applied to communication signals in the receiver and the transmitter may be adaptively controlled through automatic gain control algorithms implemented in the DSP.

In a data communication mode, a received signal, such as a text message or web page download, is processed by the communication subsystem 11 and is input to the microprocessor 38. The received signal is then further processed by the microprocessor 38 for output to the display 22, or alternatively to some auxiliary I/O devices 28. Data items, such as e-mail messages, may be composed using the keyboard 32 and/or some other auxiliary I/O device 28, such as a touchpad, a rocker switch, a thumb-wheel, a trackball, a touchscreen, or some other type of input device. The composed data items may then be transmitted over the wireless carrier network 50 via the communication subsystem 11.

In a voice communication mode, overall operation of the device is substantially similar to the data communication mode, except that received signals are output to the speaker 34, and signals for transmission are generated by a microphone 36. Alternative voice or audio I/O subsystems, such as a voice message recording subsystem, may also be implemented on the mobile communication device 10. In addition, the display 22 may also be utilized in voice communication mode, for example, to display the identity of a calling party, the duration of a voice call, or other voice call related information.

The short-range communications subsystem 40 enables communication between the mobile communication device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

In one embodiment, the software resident on the device 10 includes a messaging application 56. Under instructions from the messaging application 56 resident on the device 10, the processor 38 is configured to implement a messaging module 60, represented in FIG. 2, for interacting with various device subsystems described above for permitting actions to be taken in relation to messages, and more specifically messages or other items, such as tasks, calendar items, etc., may be sent, received and displayed. In some embodiments, some or part of the functionality of the messaging module 300 can be implemented through firmware or hardware components instead of, or in combination with, computer software instructions executed by the microprocessor 38 (or other processors).

It is again noted that the present application is not limited to use in association with e-mail messages and may apply to other electronic messages where possible, including SMS messages, and other "items", including calendar entries, task list entries, and other items having a date-time stamp associated with them. References in the present application to "messages" or a "messaging application" should be understood to encompass and include possibilities within this wider range of items.

Figures 3, 4:
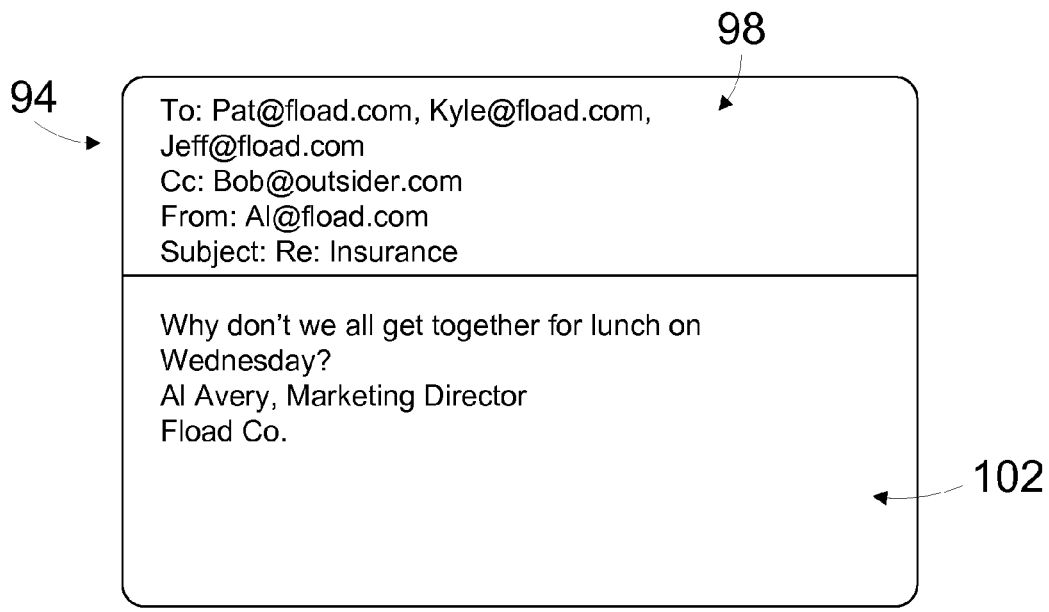
FIG. 3 shows, in diagrammatic form, a first user interface screen of a possible messaging application for the device of FIG. 1.
FIG. 4 shows, in diagrammatic form, a second user interface screen of the messaging application of FIG. 3, the second user interface screen being that of a displayed message.

Referring to FIG. 3, a user interface screen 70 of an example embodiment of the messaging application 56 is illustrated. The user interface screen 70 is an example of a screen presented on the display of a mobile communication device after receipt of a request that the messaging application 56 display received messages in a list. This is typically done by clicking on an icon or a menu/list choice associated with a request to display inbox folder contents.

In the user interface screen 70, a plurality of messages 74 are listed vertically. Going from left to right in the user interface screen 70, there is a message icon column 78, a sender identifier column 82 and a message subject column 86. Icons 88 in the icon column 78 can provide information about the e-mails with which they are associated. For example, an icon 88 associated with an e-mail that has already been read can provide this information to the user by means of an appropriate graphical image displayed to the user (e.g., an envelope with its flap opened). Similarly an appropriate graphical image could be used for an e-mail that has not been read (e.g., an envelope with its flap closed). The columns 82 and 86 also provide information about the messages 74. In the column 82, the names of the people who sent the messages 74 are listed. In the column 86, the subject lines of the messages 74 are shown.

It will be understood that the display of the mobile communication device could show additional/fewer and/or different columns than those shown in FIG. 3. Some examples of alternative columns are importance, flag status, presence of attachment(s), received date, and message size. Due to the typical width of the display of a mobile communication device, it will normally not be desirable to have a large number of columns, and it will normally be desirable to show the columns that provide the most useful information keeping in mind that the user is probably looking for a particular message at the stage shown in FIG. 3.

Message 90 of the messages 74 has been highlighted. The sender of the message 90 is "Al Avery", and the subject line of the message is "RE: Insurance". A request may be received, using one or more of the input devices of his mobile communication device, requesting that the message 90 be opened (i.e., a request to have the message 90 displayed is received).

FIG. 4 is a user interface screen 94 of the displayed message 90. Message header 98 contains various lines of information. The origin, or "From:", line contains the e-mail address of the message sender. The destination, or "To:", line contains the e-mail addresses of the individuals to whom the message has been sent. The Carbon Copy recipient, or "CC:", line contains the e-mail address "Bob@outsider.com", and "Bob" is a person that has been Carbon Copied, or "CCed", a copy of the e-mail. The "Subject:" line contains the subject of the e-mail (i.e., "RE: Insurance"). It will be understood that the header 98 could show additional/less and/or different information than what is shown. In addition, not all of the illustrated information lines would necessarily be displayed immediately. For example, input of a request to scroll up may be received before all of the illustrated lines would appear on the display screen of the user's mobile communication device.

Below the header 98 is a message section 102 that contains the text of the message. Also, the section 102 is commonly referred to as the message body. As will be understood from reading the text contained in the message body 102, Al Avery has sent an invitation to Pat, Kyle, Jeff and Bob. More specifically, Al has invited all of these people to lunch on Wednesday. As sometimes happens in message threads, Al's e-mailed invitation may be off-topic (i.e., discussing lunch instead of "Insurance").

Figure 5:
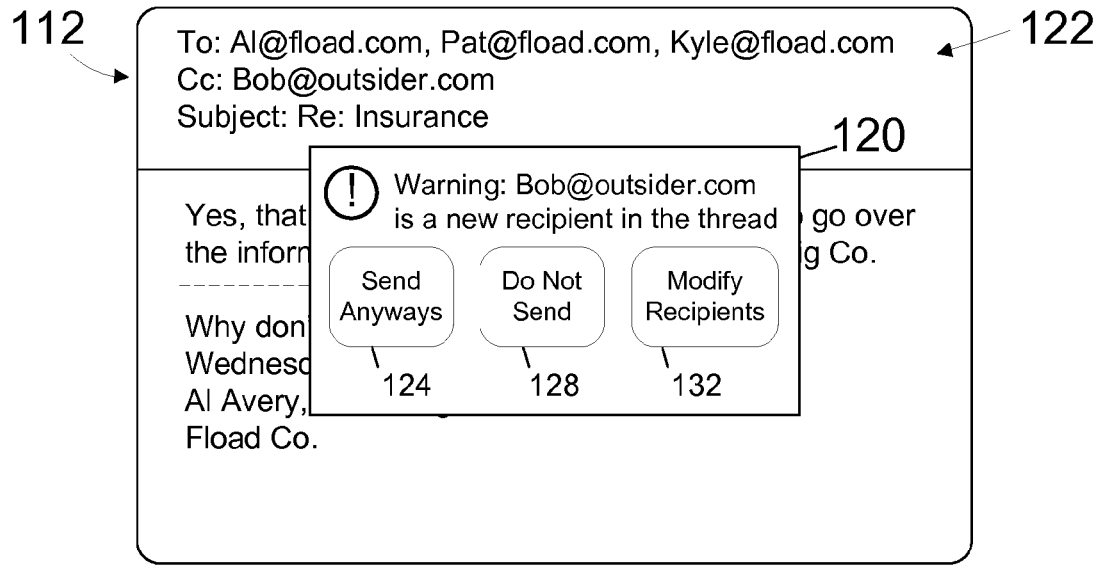
FIG. 5 shows, in diagrammatic form, a user interface screen generated after a person tries to send a reply-to-all message composition derived from the displayed message.

Still with reference to the example message from Al Avery, FIG. 5 is a user interface screen 112 illustrating a dialog window 120 superimposed over a reply-to-all message composition derived from the original message 90. The list of e-mail addresses to which the message composition is intended to be sent is contained in the "To:" line of header 122. Also, any e-mail addresses to which the message composition is intended to be "carbon copied" are contained in the "Cc:" line of the header 122. In this example, the original message sender and the other individuals to whom the original message was sent appear in the "To:" line. As in the original message, "Bob@outsider.com" appears in the "Cc:" line. This is usually what happens when a user makes a request to compose a reply-to-all message, as opposed to a request to compose a reply message where typically only the address of the original message sender will appear (in the "To:" line).

In this particular example, "Bob@outsider.com" happens to be an e-mail address that Al Avery newly introduced into the "Insurance" message thread by sending the e-mail 90. Thus when one or more of the input devices of his mobile communication device is used to submit a request to send the reply-to-all message composition, the dialog window 120 promptly appears to notify the user of the new recipient in the "Insurance" message thread. There exists a need for selection of one of three presented options 124, 128 and 132, which are "Send Anyways", "Do Not Send" and "Modify Recipients".

It will be understood that the notification provided to the user need not indicate who are the new recipients in the thread. With reference to the dialog window 120, it could simply state "Warning: There is at least one new recipient in the thread", instead of the dialog window 120 stating "Warning: Bob@outsider.com is a new recipient in the thread". Also, instead of the dialog window 120 providing the user with three options, the options 124 and 128 (but not the option 132) could be provided. Furthermore, one skilled in the art will appreciate that there are other ways of providing a notification with accompanied selection options.

Also, the user need not be provided with selection options or be required to take action in relation to the notification. In one embodiment, notification is implemented by having a field at the beginning of the message body with one or more icons for indicating which recipients have been added. In addition, one or more of the various ways of notifying the user could be combined to better ensure that the user is notified.

Figure 6:
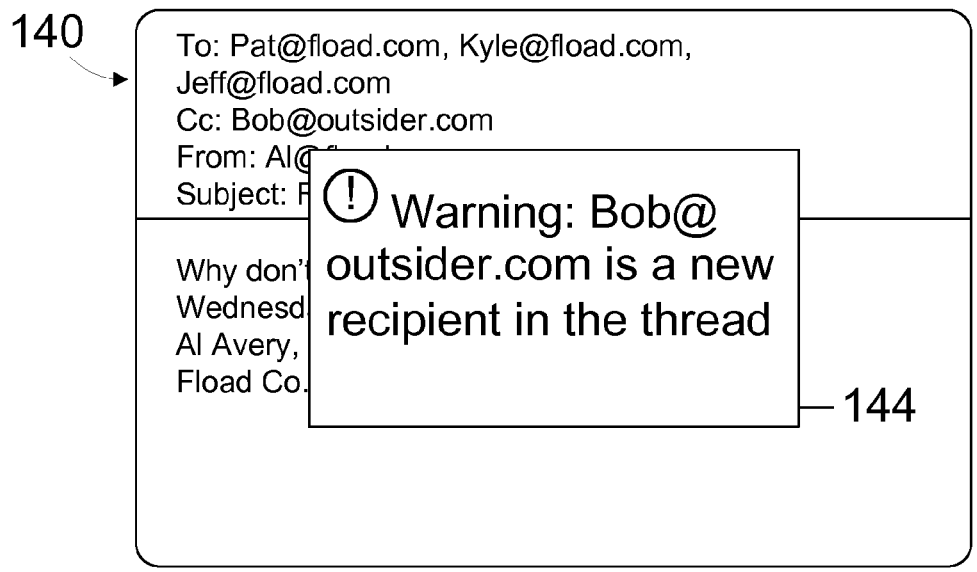
FIG. 6 shows, in diagrammatic form, another user interface screen illustrating notification in accordance with an alternative example embodiment.

FIG. 6 illustrates a user interface screen 140 similar to the user interface screen of FIG. 4, but in this user interface screen a dialog window 144 is superimposed over the displayed message 90. The user interface screen 140 relates to a changed recipient indication method in accordance with an alternative example embodiment. For the purposes of describing this alternative embodiment, reference again is made to FIG. 3 where the message 90 of the messages 74 has been highlighted. Again in this example, a request is received, using one or more of the input devices of his mobile communication device, requesting that the message 90 be opened (i.e., displayed). Promptly after making the request, not only is the message 90 displayed, but the dialog window 144 is superimposed over the displayed message. The dialog window 144 provides a notification to the user that "Bob@outsider.com" is a new recipient in the "Insurance" thread. In one embodiment, this notification is provided because the messaging application detected that the "Bob@outsider.com" e-mail address was newly introduced into the message thread by Al Avery when he sent the message 90.

Figure 7:
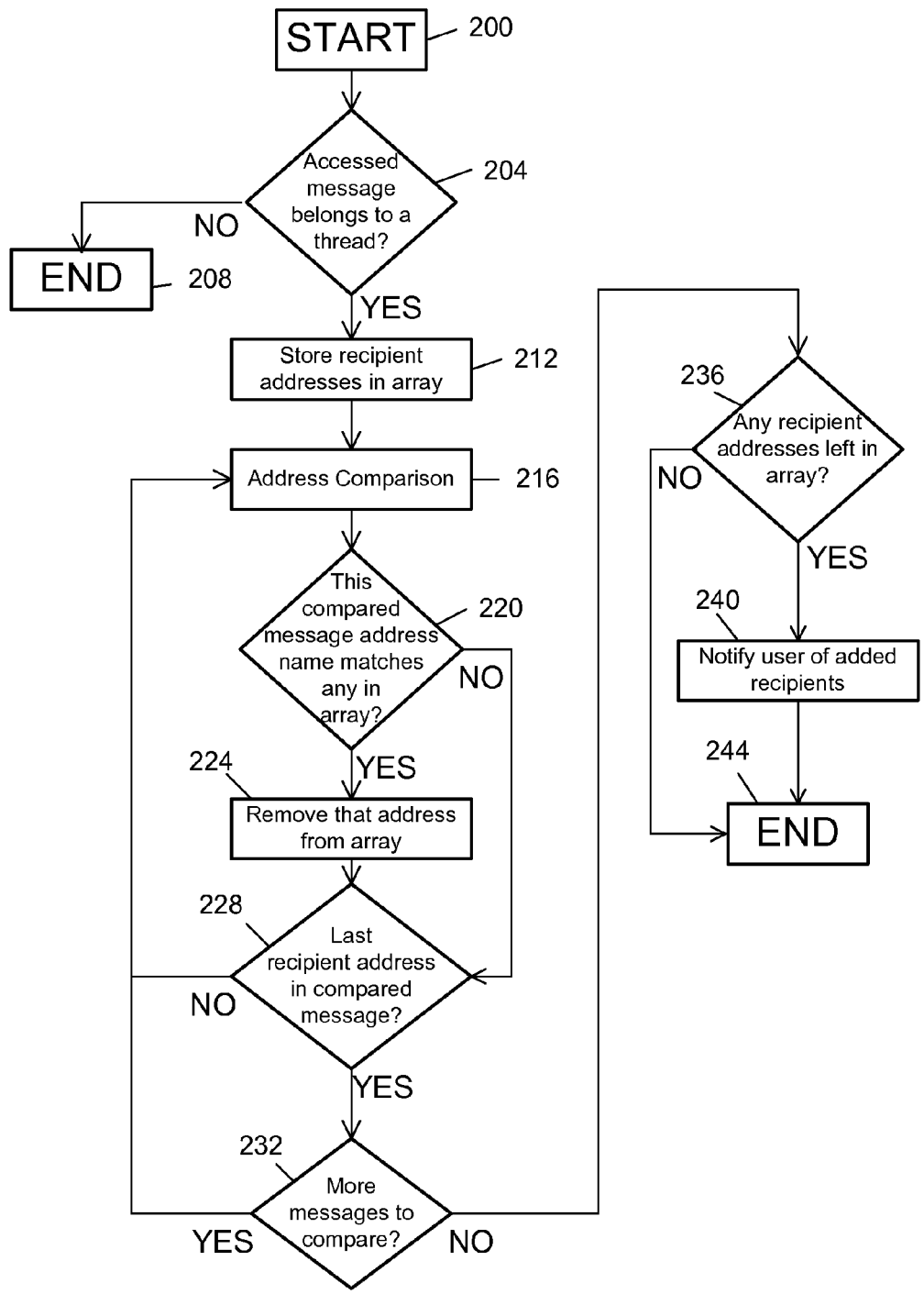
FIG. 7 shows, in flow chart form, an example embodiment of an added recipient indication method.

FIG. 7 is a flow chart further illustrating an added recipient indication method in accordance with an example embodiment. In at least one configuration, the method can be implemented through computer instructions embodied in an added recipients detection and notification module 57 stored on the device 10. In various example embodiments, the module 57 may be a subcomponent of the messaging application 56, or other applications 58, or may be a standalone application 57 that interacts with the messaging application 56.

The method starts at step 200, where input is received in the form of a request for an available message to be displayed. At decision step 204, the messaging application makes a determination as to whether the selected message (accessed message) belongs to a thread. It will be understood that there are different ways in which a set of messages can be identified as belonging to a common thread. In the case of e-mails contained in message folders (inbox folder, sent items folder, deleted items folder, etc.), the messaging application could look for matching subject lines of messages (ignoring any portions such as "Re:", "RE:", "Fw:", "FW:" at the beginning of any of the subject lines). Another way in which a set of messages could be identified as belonging to a common thread would be by use of a unique identifier present in each message belonging to the set. It will be understood that such an identifier need not be found in the subject line portion of the message. In some embodiments, the entire message thread can be contained in the e-mail body of the most recent email, and the messaging application may scan the content of the e-mail body for the addresses of one or more prior e-mails in the email body to detect changes in the recipients.

If the accessed message does not belong to a thread (i.e., it is a lone message) then the indication process ends at step 208 without the need to provide the user with any notification. If however the accessed message does belong to a thread, each different recipient address of the accessed message is stored in an array at step 212. After the step 212, the next stage in the illustrated method includes making recipient address comparisons against the recipient addresses of the most recent prior message belonging to the set of messages. It will be understood that the most recent prior message is identified by its date-time stamp (i.e., it is important that information about how old a particular message is be extractable from the message). At step 216, a first recipient address of the most recent prior message is compared against each of the addresses stored in the array. Next at step 220, a determination is made as to whether this first recipient address matches any of the addresses stored in the array. If there is a match, the matching address is removed from the array at step 224 (so there is now one less address in the array), and the next step is decision step 228. If there is no match, then no action is taken in relation to the array, and the step 228 follows the step 220.

At the step 228, a check is done to determine whether or not there are any more recipient addresses left for comparison against the addresses stored in the array. If there are additional recipient addresses left for comparison, the steps 216 through 224 are repeated until there are no more addresses. Once this occurs, the next step is decision step 232. At this step, a determination is made as to whether there are any more older messages left for recipient address comparison. Also, it will be understood that in those cases where the messages are stored in folders, it will normally be desirable to process messages in not only the inbox folder, but in other folders as well. If there are additional older messages left in the message thread, the steps 216 through 228 are repeated until there are no more older messages. Once this occurs, the next step is decision step 236.

At the step 236, a check is done to determine whether or not there are any recipient addresses left in the array. If there are one or more recipient addresses left in the array, this means that the selected message has at least one recipient previously absent from the message thread. In this case, the user is notified at step 240 that there are added recipients. The added recipient indication method then ends at step 244. In the case where there are no recipient addresses left in the array, no action is taken before the method ends at the step 244 because there is no need to provide the user with any notification.

It will be understood that the illustrated method could be modified so that steps are taken in a different order and/or different steps are taken without substantially changing the result. For example, the decision step 236 could be between the decision steps 228 and 232 instead of after the decision step 232. In this case, a check to see if there are any more recipient addresses left in the array would be done repeatedly every time before continuing to the next older message in the thread.

In an alternative added recipient indication method, the decision step 232 is omitted and the recipient addresses of the selected message are only compared to the recipient addresses of the most recent prior message. This avoids the need to scan all of the messages in the thread with the advantage that if one or more recipients are removed and then added again, the user will be notified.

In another alternative added recipient indication method, the steps 204 through 236 are performed on any received new messages, promptly after a new message is made available to the messaging application. In this way any added recipient addresses would normally be detected before an inputted request to display the new message. One skilled in the art will appreciate that the results of the scanning could then be cached so that notification could be provided at some moment in time after the inputted request to display the message without a scanning delay (associated with the method steps 204 through 236) then being experienced.

Figure 8:
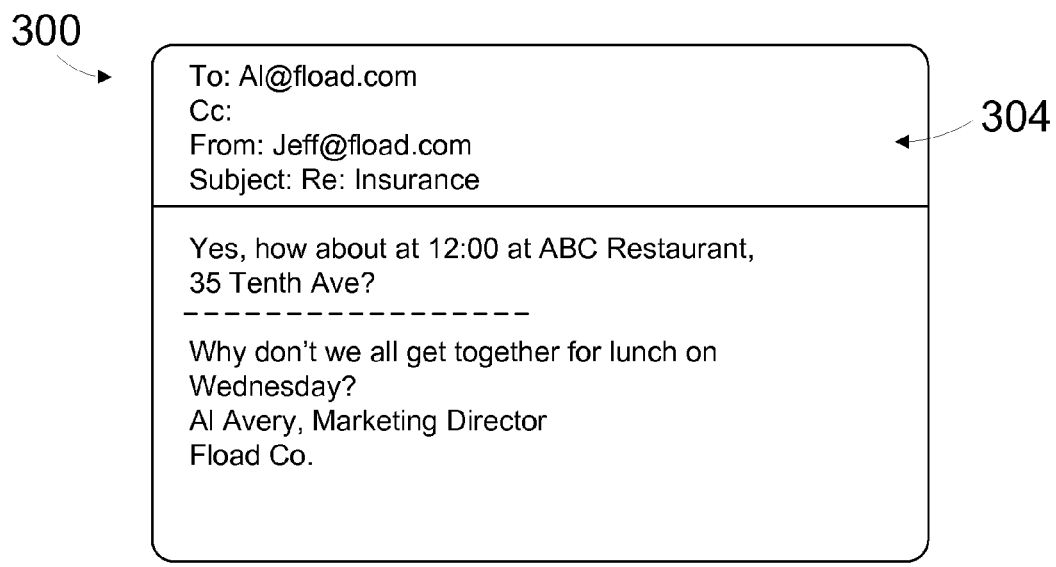
FIG. 8 shows, in diagrammatic form, another user interface screen of the messaging application of FIG. 3, this interface screen being that of another displayed message which is a reply to the message shown in FIG. 4.

Continuing with the "Insurance" message thread example, FIG. 8 is a user interface screen 300 of a displayed message, in particular a reply to the message shown in FIG. 4. Additionally, as can be determined from message header 304, "Jeff@fload.com" sent the illustrated message to "Al@fload.com". No other e-mail addresses besides "Al@fload.com" appear in the "To:" or the "Cc:" line of the message header 304. In other words, "Jeff@fload.com" only sent his reply to the question about the possibility of having lunch on Wednesday to "Al@fload.com". From the message header 304, it appears that others who received the previous message from "Al@fload.com" did not receive a copy of this message from "Jeff@fload.com". This may have been the result of the message sender (Jeff@fload.com) accidentally forgetting to have sent his message as a "reply-to-all" message instead of just a normal reply message, or it could have been for some deliberate reason.

Figure 9:
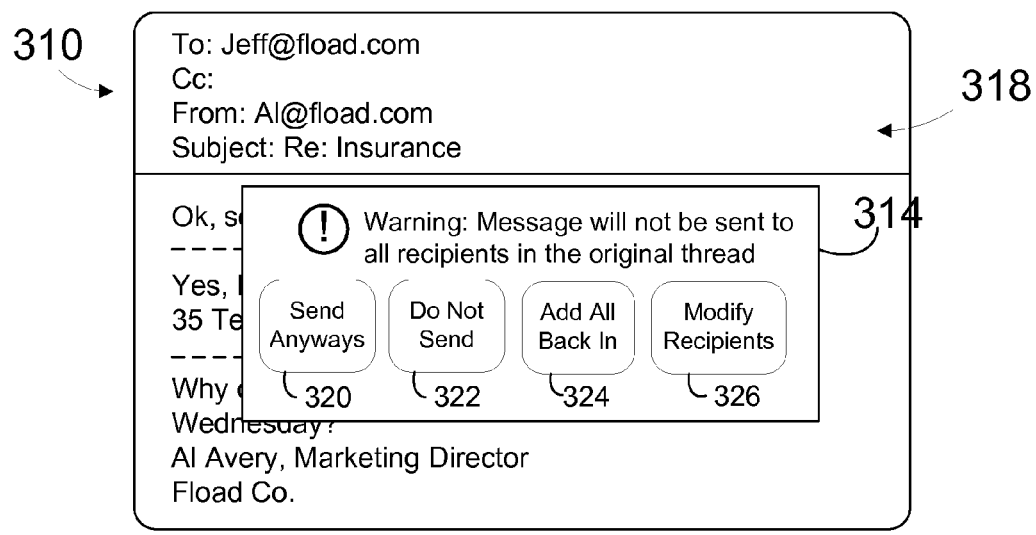
FIG. 9 shows, in diagrammatic form, a user interface screen generated after a person tries to send a reply-to-all message composition derived from the message shown in FIG. 8.

Still with reference to the example message from "Jeff@fload.com", FIG. 9 is a user interface screen 310 illustrating a dialog window 314 superimposed over a reply-to-all message composition derived by the messaging application on the device of Al@fload.com from the message shown in FIG. 8. In some embodiments, the dialog window 314 may be displayed right after input is received indicating a desire to use the "reply-to-all" feature, or the dialog window 314 may be generated after composition of the reply message and provided a "send" message input to the device 10. From header 318 it will be seen that "Jeff@fload.com" is the only e-mail address in the "To:" line of the header 318, and that there are no e-mail addresses in the "Cc:" line of the header 318. Consequently, if transmitted in the illustrated state, the message would only be sent to "Jeff@fload.com".

In this particular example, a number of e-mail addresses that were included at a previous instance in time are no longer included because "Jeff@fload.com" removed those addresses when he composed and sent the message shown in FIG. 8. Thus in accordance with an example embodiment, when one or more of the input devices of the mobile communication device has been used to submit a request to send the reply-to-all message composition, the dialog window 314 promptly appears to notify the user (in this case Al@fload.com) of removed recipients (those recipients who received previous messages in the thread but who were removed from the latest email) will not receive a copy of the message intended to be sent. There exists a need for a selection of one of four presented options 320, 322, 324 and 326, which are "Send Anyways", "Do Not Send", "Add All Back In" and "Modify Recipients".

It will be understood that the notification provided to the user could provide additional information besides notification of the fact that the message will not be sent to all recipients in the thread. For example, the notification could also list the e-mail addresses that were removed. Also, instead of the dialog window 314 providing the user with four options, fewer options could be provided. For example, the options 320, 322 and 326 (but not the option 324) could be provided. As another example, the options 320 and 322 (but not the options 324 and 326) could be provided. Furthermore, one skilled in the art will appreciate that there are other ways of providing a notification with accompanying selection options. In addition, it will be understood that the dialog box 314 could appear in connection with other types of message compositions besides reply-to-all compositions. For example, use in conjunction with reply-to-sender (only) and forward message compositions is contemplated.

Figure 10:
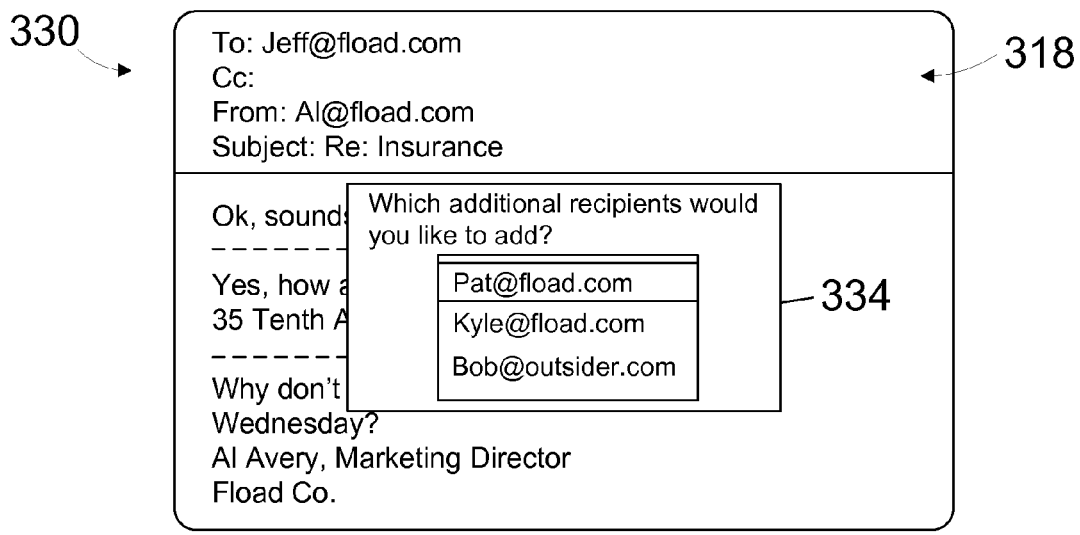
FIG. 10 shows, in diagrammatic form, a user interface screen generated after a person selects the "Modify Recipients" option from within the user interface screen shown in FIG. 9.

FIG. 10 shows a user interface screen 330 generated after a person selects the "Modify Recipients" option from within the user interface screen 310 shown in FIG. 9. The dialog box 334 lists missing recipients which can be selected for addition to the message composition, these missing recipients being: "Pat@fload.com", "Kyle@fload.com" and "Bob@outsider.com". It will be understood however that there are alternative possibilities for implementation of the option 326 ("Modify Recipients"). For example, selecting the option 326 could simply bring a cursor to the "To:" or "Cc:" line in the header 318. In the case where option 324 "Add All Back In" (instead of "Modify Recipients" option 326) is selected from dialog box 314, the messaging application just automatically populates the "to" (or CC) fields with the addresses of the missing recipients.

Figure 11:
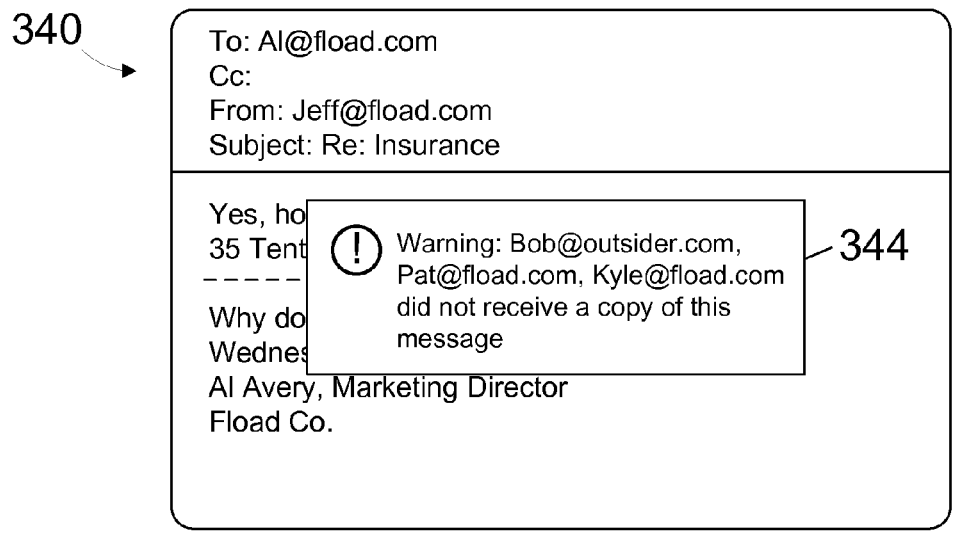
FIG. 11 shows, in diagrammatic form, another user interface screen illustrating notification in accordance with an alternative example embodiment.

FIG. 11 illustrates a user interface screen 340 similar to the user interface screen of FIG. 8, but in this user interface screen a dialog window 344 is superimposed over the displayed message. The user interface screen 340 relates to a changed recipient indication method in accordance with an alternative example embodiment. In a number of examples, a dialog window similar to the dialog window 344 appears promptly after making a request from a message list (like the one shown in FIG. 3) to open the message. The dialog window 344 provides a notification to the user that "Bob@outsider.com", "Pat@fload.com" and "Kyle@fload.com" (members of the message thread by virtue of the fact that they have received and/or sent at least one message belonging to the message thread) did not receive a copy of the message from "Jeff@fload.com". In one embodiment, this notification is provided because the messaging application detected that the above mentioned three e-mails were not maintained in the reply-to message composition of "Jeff@fload.com" that was derived from the message 90.

Figure 12:
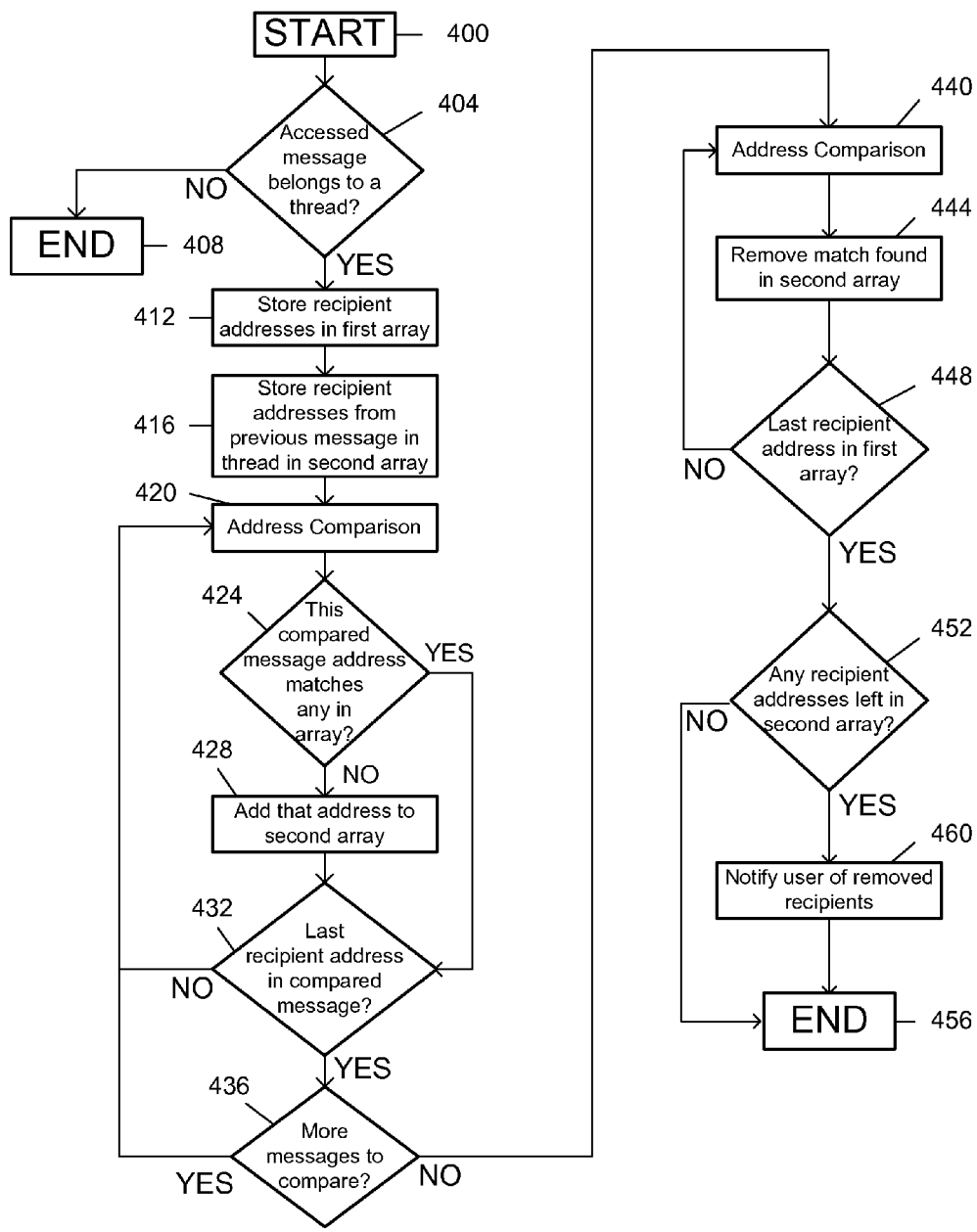
FIG. 12 shows, in flow chart form, an example embodiment of a removed recipient indication method.

FIG. 12 is a flow chart further illustrating the removed recipient indication method in accordance with an example embodiment. In at least one configuration, the method can be implemented through computer instructions embodied in a removed recipients detection and notification module 59 stored on the device 10 (FIG. 1). In various example embodiments, the module 59 may be a subcomponent of the messaging application 56, or other applications 58 or maybe a standalone application 59 interacts with the messaging application 56. The functionality of Added Recipients Detection and Notification Module 57 and Removed Recipients Detection and Notification Module 59 can be integrated into a single "Changed Recipients Detection and Notification Module".

The method starts at step 400, where input is received in the form of a request for an available message to be displayed to him. At decision step 404, the messaging application makes a determination as to whether the selected message (accessed message) belongs to a thread. Example ways in which this could be done have previously been discussed.

If the accessed message does not belong to a thread (i.e., it is a lone message) then the indication process ends at step 408 without the need to provide the user with any notification. If however the accessed message does belong to a thread, each different recipient address of the accessed message is stored in a first array at step 412. After the step 412, the next step in the illustrated method is storing the recipient addresses of the previous message in the thread in a second array (step 416). These initial recipient messages put into the second array provide a starting point for possibly determining additional members of the thread once even older messages are scanned. It will be appreciated that just by looking at the first previous message in the thread one may not obtain all of the members in the thread because, for instance, various recipients might have been added and removed at various points along the history of the message thread. Therefore, steps 420 through 436 are carried out to see if additional recipient addresses need to be added to the second array so that the second array stores as many of the thread recipient addresses as can be determined from processing the messages of the user's message account.

At step 420, a first recipient address of the next prior message is compared against each of the addresses stored in the second array. Next at step 424, a determination is made as to whether this first recipient address matches any of the addresses stored in the second array. If there is a match, then no action is taken in relation to the array, and decision step 432 follows the step 424. If there is no match, a new member in the thread has been found, so the recipient address is added to the second array (the array is now one element bigger than before). The step following the step 428 is the decision step 432.

At the step 432, a check is done to determine whether or not there are any more recipient addresses left for comparison against the addresses stored in the array. If there are additional recipient addresses left for comparison, the steps 420 through 428 are repeated until there are no more addresses. Once this occurs, the next step is decision step 436. At this step, a determination is made as to whether there are any more older messages left for recipient address comparison. Also, it will be understood that in those cases where the messages are stored in folders, it will normally be desirable to process messages not only in the inbox folder, but in other folders as well. If there are additional older messages left in the message thread, the steps 420 through 432 are repeated until there are no more older messages. Once this occurs, the next stage in the illustrated method is to determine what members in the second array are missing from the first array in order to determine thread members that are missing from the accessed message.

At step 440, each recipient address of the second array is compared against the first member of the first array to determine the member in the second array that is the same as the member in the first array being compared, so that that member can be removed from the second array, this removal occurring at step 444 (the subsequent step). Decision step 448 follows the step 444. At this step, a determination is made as to whether or not all of the recipient addresses in the first array have been processed. If this is not the case, then the steps 440 and 444 repeat until all the members of the first array have been removed from the second array. Once this is done, the next step is decision step 452. At the step 452, a determination is made as to whether or not there are any recipient addresses left in the second array. As discussed, these addresses would be thread member recipient addresses missing from the "To:" or "Cc:" lines of the message accessed at the start step 400. If there are no recipient addresses left in the second array, then the indication process ends at 456 without the need to provide the user with any notification. If however there are any recipient addresses left in the second array, step 460 follows the step 452, and the user is notified of there being missing thread members. In some embodiments, the user is notified immediately upon opening the message (such as shown in FIG. 11); in some embodiments, the user is given an additional notification such as shown in FIG. 9 when they start to compose a reply and/or send a reply (in some cases the notification may be limited only to when there has been a selection of "reply-to-all", but in some cases the notification can also be displayed where there has been a selection of only "reply", or in some cases "forward").

In an alternative removed recipient indication method, the steps 420 through 436 are omitted so that the step 440 immediately follows the step 416. This avoids the need to scan all of the messages in the thread, so that the recipient addresses of the message accessed in the step 400 are only compared against the first message preceding in time to that accessed message, and recipient addresses that were removed at a more previous point in the message thread would not be relevant.

In another alternative removed recipient indication method, the steps 404 through 452 are performed on any received messages, promptly after a new message is made available to the messaging application. In this way any removed recipient addresses would normally be detected before an inputted request to display the new message. One skilled in the art will appreciate that the results of the scanning could then be cached so that notification could be provided at some moment in time after the inputted request to display the message while avoiding a scanning delay associated with the method steps 404 through 452.

In some embodiments, the methods described above for detecting added recipients and removed recipients can both be performed and the user notified of both added recipients and removed recipients.

Certain adaptations and modifications of the described embodiments can be made. Therefore, the above discussed embodiments are considered to be illustrative and not restrictive.

Figure 13:
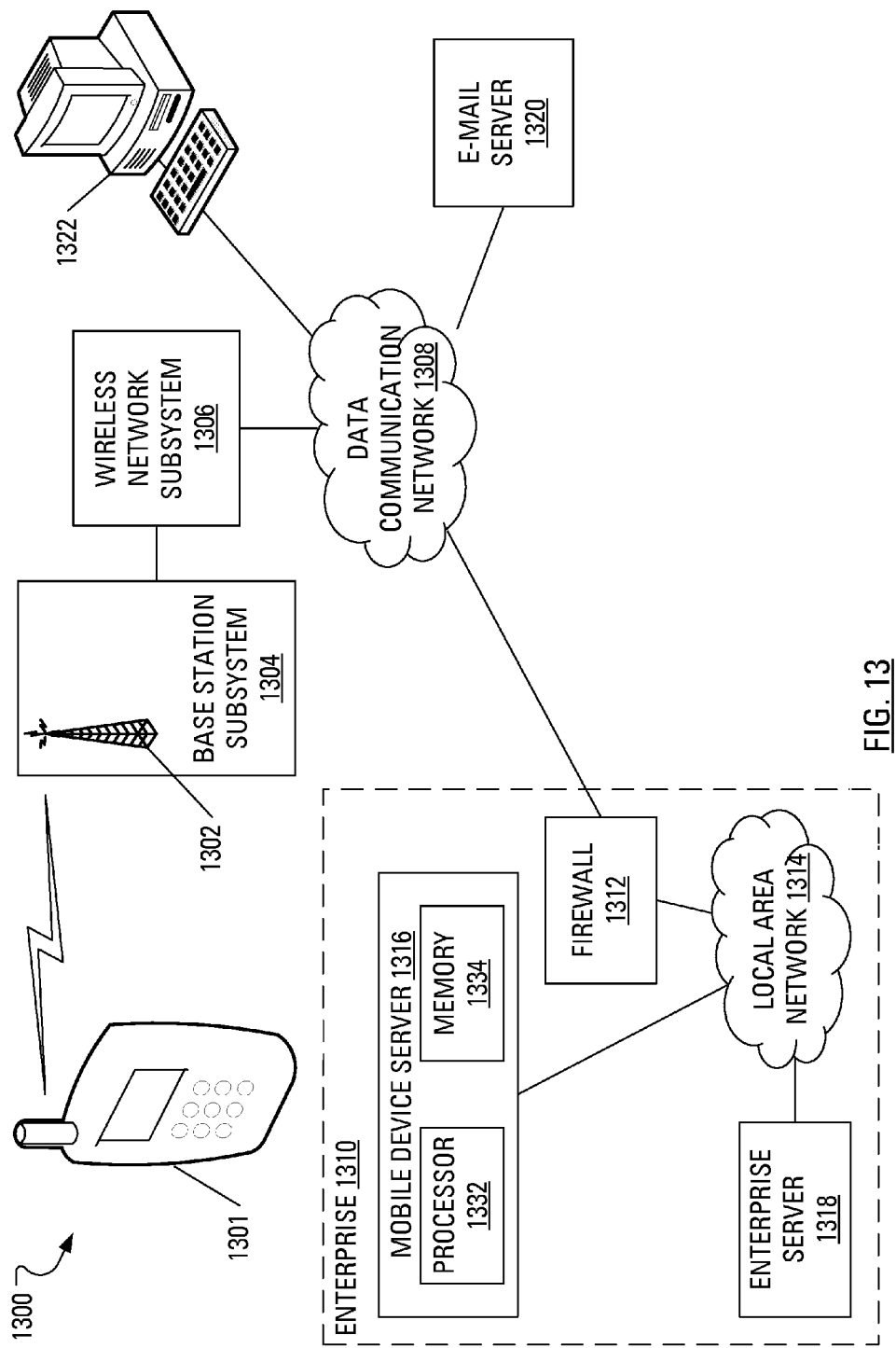
FIG. 13 illustrates elements of an exemplary network environment for electronic messaging, the elements including a mobile communication device and an enterprise.

FIG. 13 illustrates elements of an exemplary network environment 1300 for electronic messaging. The elements of the exemplary network environment 1300 include multiple wireless carrier networks and a data communication network 1308, which may be considered to represent at least one wide area network, such as the present day Internet and successors, as well as, potentially, multiple local area networks. A base station antenna 1302, with which a mobile communication device 1301 may communicate wirelessly, is provided as part of a base station subsystem 1304.

The base station subsystem 1304 connects to a wireless network subsystem 1306. In an example GSM implementation, the wireless network subsystem 1306 includes, among other components, a Mobile Services Switching Center, a Home Location Register, a Visitor Location Register, a relay and a Short Messaging Service Center (SMSC). As illustrated in FIG. 13, the wireless network subsystem 1306 is connected to the data communication network 1308.

The mobile communication device 1301 may be associated with an enterprise 1310 connected to the data communication network 1308. The enterprise 1310 may, for instance, include a firewall or proxy server 1312 connecting to the data communication network 1308 and to a local area network (LAN) 1314. The LAN 1314 may allow communication between a mobile device server 1316 and an enterprise server 1318 and between the servers 1316, 1318 and other network entities (not shown) through the data communication network 1308. The mobile device server 1316 includes components such as a processor 1332 and a memory 1334.

Also connected to the data communication network 1308 may be an e-mail server 1320 and a desktop computer 1322, which may be associated with a user having an account on the e-mail server 1320.

In general, a message addressed to the user associated with the mobile communication device 1301 may be retrieved from the enterprise server 1318 by the mobile device server 1316. The mobile device server 1316 may then arrange transmission of the message to the mobile communication device 1301.

It may be considered that the recipient change notification methods described hereinbefore are well suited to those situations wherein an entire message is received by a messaging application executed at the mobile communication device 1301. However, for various reasons, the messaging application may not always receive an entire message. That is, the mobile device server 1316 may truncate the message to conserve the quantity of data communicated to the mobile communication device 1301.

While, typically, when the mobile device server 1316 truncates a message, the mobile device server 1316 truncates the body of the message, there exist situations wherein the mobile device server 1316 may truncate other parts of a message, such as the message header. For example, where a particular message has a large number of recipients identified in the message header, the mobile device server 1316 may truncate the header so that the truncated message only retains a predetermined number of indicated recipients and, in addition, perhaps an indication that the recipient list has been truncated. In such situations, recipient change notification methods carried out by a messaging application at the mobile communication device 1301 may be seen to be ineffectual, as such a messaging application does not have access to a complete list of the recipient addresses. Accordingly, there may be a need for some server-side processing.

Figure 14:
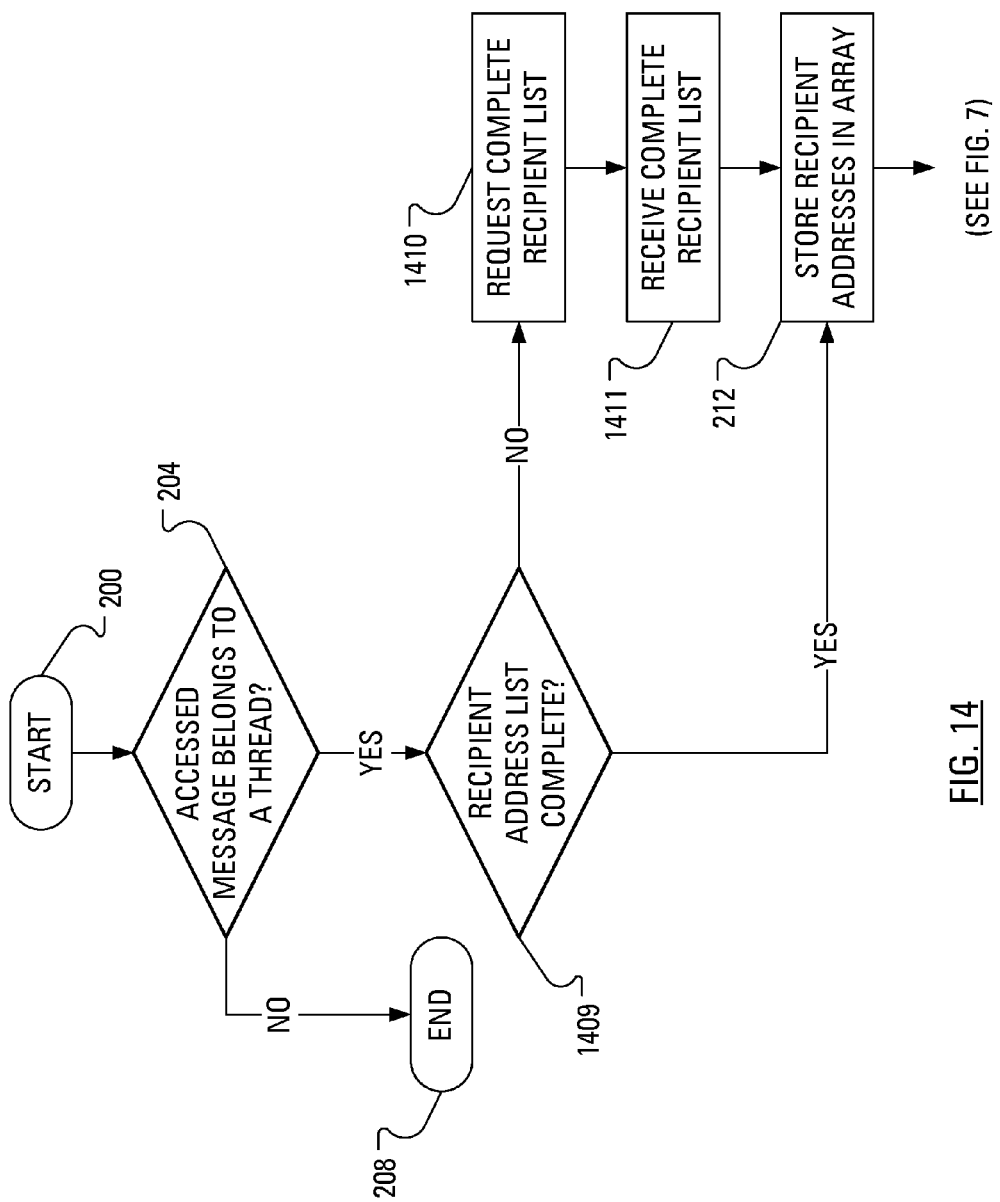
FIG. 14 illustrates portion of the added recipient indication method of FIG. 7 amended, in accordance with an example implementation, to include further steps.

A portion of the added recipient indication method of FIG. 7 is illustrated in FIG. 14. The portion has been amended, in accordance with an example implementation, to include further steps. In particular, the messaging application determines (step 204) whether the selected message (accessed message) belongs to a thread. Upon determining (step 204) that the accessed message does not belong to a thread (i.e., it is a lone message) then the indication process ends (step 208) without the need to provide the user with any notification. If, however, the accessed message does belong to a thread, the messaging application determines (step 1409) whether the recipient address list for the selected message is complete. Such determining (step 1409) may involve, for example, determining whether the selected message includes a header that includes an indication that said list of recipient addresses is incomplete. Upon determining (step 1409) that the recipient address list for the selected message is complete, the messaging application stores (step 212) each different recipient address of the accessed message in an array.

Upon determining (step 1409) that the recipient address list for the selected message is incomplete, the messaging application may transmit (step 1410) a request, to the mobile device server 1316, a request for the complete recipient address list. The messaging application may then receive (step 1411), the complete recipient address list and store (step 212) each different recipient address of the complete recipient address list in an array.

With regard to the path taken to reach the storage of recipient addresses in the array, the added recipient indication method may then continue as presented in FIG. 7. Notably, the removed recipient indication method of FIG. 12 may be similarly modified.

Whether the method determines that a recipient address has been added or removed, the messaging application may cache the recipient change information for later use.

Aspects of the presentation of the notification (step 240 in FIG. 7, step 460 in FIG. 12) may be configurable. For example, the notification may be turned on or off. Furthermore, the time at which the notification is presented should be configurable. For example, an option may be available to have the notification presented responsive to the opening of the message or responsive to a command to commence composing a response to add to the thread.

Only visible recipients (i.e., those in the "To" and "CC" fields of a message header) will generate warnings, since recipients in the "BCC" field cannot be included in the processing, given that such information is not available.

In an alternate implementation of aspects of the present disclosure, rather than process a message at the mobile communication device 1301 to determine recipient changes, the message may be processed at the mobile device server 1316.

Figure 15:
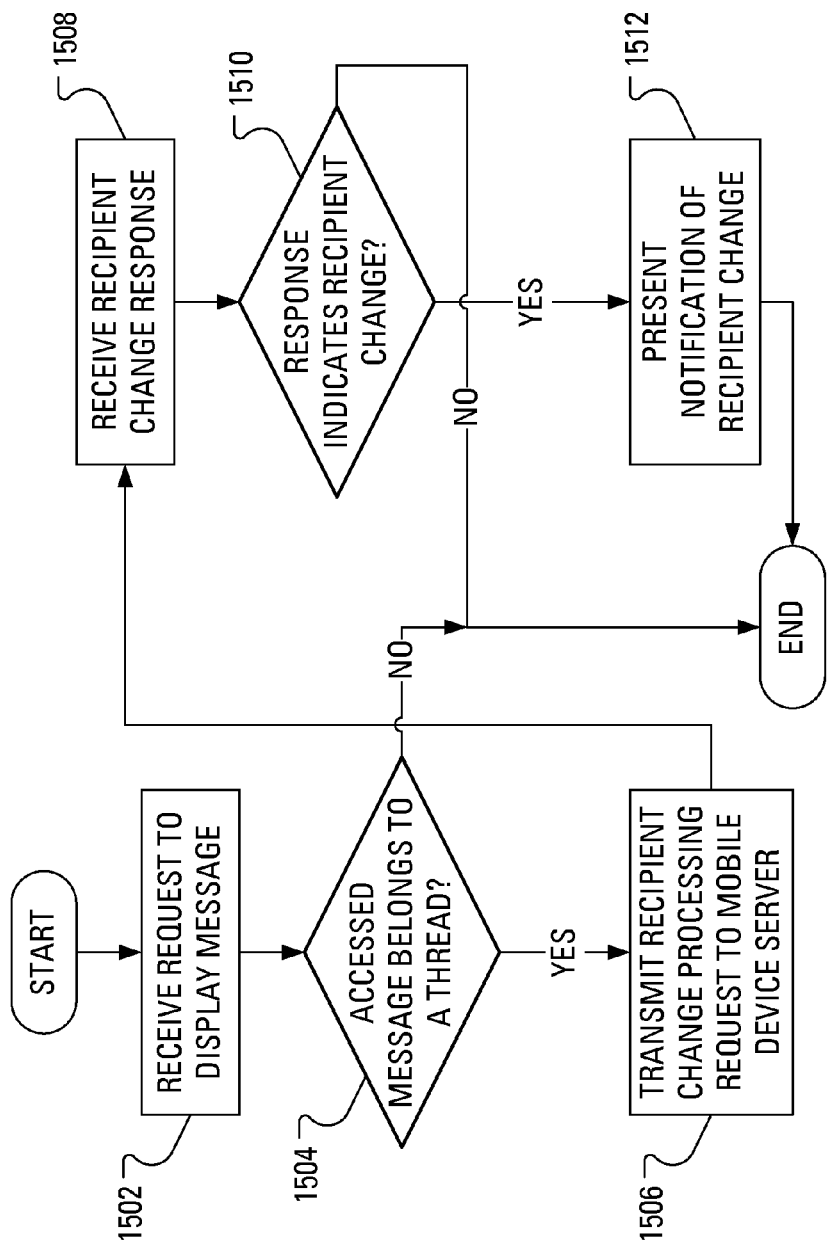
FIG. 15 illustrates a flow chart of example steps in an added recipient indication method, in accordance with an example implementation.

FIG. 15 illustrates a flow chart of example steps in an added recipient indication method in accordance with an example implementation. In at least one configuration, the method can be implemented through computer instructions embodied in an added recipients detection and notification module 57 stored on the device 10. In various example embodiments, the module 57 may be a subcomponent of the messaging application 56, or other applications 58, or may be a standalone application 57 that interacts with the messaging application 56.

Initially, input may be received indicative of selection of a message and a request for the message to be displayed. The messaging application receives (step 1502) the request and determines (step 1504) whether the selected message (accessed message) belongs to a thread. Upon determining (step 1504) that the accessed message does not belong to a thread (i.e., it is a lone message) then the indication process ends without the need to provide the user with any notification. Upon determining (step 1504) that the accessed message does belong to a thread, the messaging application may transmit (step 1506) a recipient change processing request to the mobile device server 1316. The messaging application may then receive (step 1508) a recipient change processing response from the mobile device server 1316. Upon determining (step 1510) that the response indicates no change in the recipients, then the indication process ends without the need to provide the user with any notification. Upon determining (step 1510) that the response indicates a change in the recipient address list, the messaging application may present (step 1512) notification of the change in the recipient address list.

Figure 16:
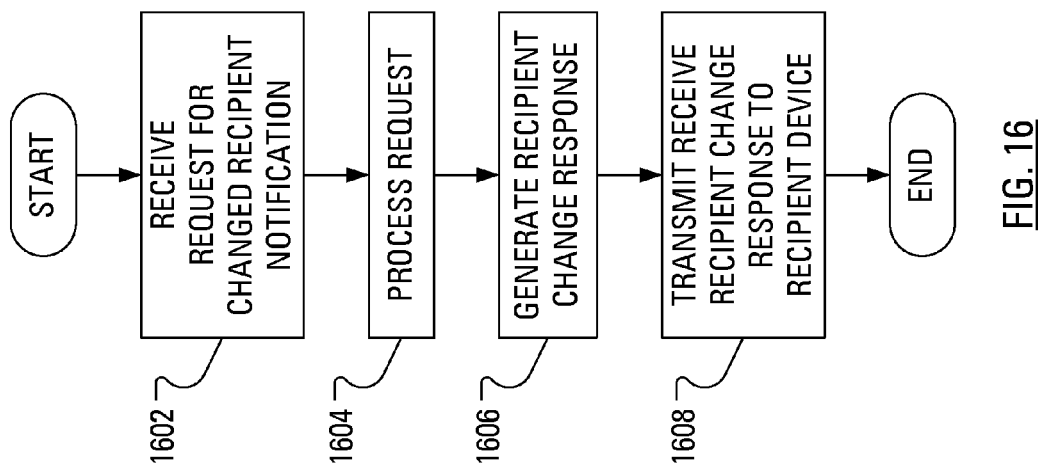
FIG. 16 illustrates example steps in a method of handling a request for changed recipient notification, in accordance with an example implementation of an aspect of the present disclosure.

FIG. 16 illustrates example steps in a method of handling a request for changed recipient notification. Upon receiving (step 1602), at the mobile device server 1316, a request for changed recipient notification, the processor 1332 at the mobile device server 1316 may process (step 1604) the request. As presented hereinbefore, such processing may involve carrying out steps of the method illustrated in FIG. 7 that relate to determining that the message includes one or more added recipients. Additionally, as presented hereinbefore, such processing may involve carrying out steps of the method illustrated in FIG. 12 that relate to determining that the message has one or more fewer recipients. The processor 1332 may then generate (step 1606) a recipient change response indicating, if detected by the processing (step 1604), a change in the recipient address list and transmit (step 1608) the recipient change response to the origin of the request for changed recipient notification. As will be readily understood by those skilled in the art, if the processing (step 1604) detects no change in the recipient address list, the recipient change response will still be transmitted (step 1608) to the origin of the request for changed recipient notification. However, the recipient change response will indicate that no change is present.

Other aspects and features of the present disclosure will become apparent to those of ordinary skill in the art upon review of the following description of specific implementations of the disclosure in conjunction with the accompanying figures.

The above-described implementations of the present application are intended to be examples only. Alterations, modifications and variations may be effected to the particular implementations by those skilled in the art without departing from the scope of the application, which is defined by the claims appended hereto.

What is claimed is:

1. A changed recipient indication method comprising:
receiving, from a server, a new message having a list of recipient addresses, said new message identifiable as belonging to a message thread, said message further including an indication that said list of recipient addresses is incomplete;
transmitting a request, to said server, for a complete list of recipients;
receiving, from said server, said complete list of recipients;
determining that said received complete list of recipients differs from a list of recipient addresses in at least one message in said thread, said recipient address list of said at least one message including at least one additional recipient address;

receiving a request to display said new message; and displaying a notification dialog notifying that said new message includes said difference in recipient addresses, wherein said dialog identifies said additional recipient address.

2. The method of claim 1, wherein said at least one message in said thread comprises a most recent prior message in said thread.

3. The method of claim 2 further comprising storing said complete list of recipients in an array.

4. The method of claim 3 wherein said determining that said received complete list of recipients differs from a list of recipient addresses in said most recent prior message comprises comparing each recipient address in said list of recipient addresses in said most recent prior message to each recipient address in said array.

5. An electronic communications device comprising:
a display screen;
a user input device;
a communications system adapted to receive, over a communications network, messages having at least one recipient address;
a memory adapted to store the messages received through the communications system; and
a messaging module adapted to:
receive, through the communications system and from a server, a new message having a list of recipient addresses, said new message identifiable as belonging to a message thread, said message further including an indication that said list of recipient addresses is incomplete;
transmit a request, to said server, for a complete list of recipients;
receive, from said server, said complete list of recipients;
determining that said received complete list of recipients differs from a list of recipient addresses in at least one message in said thread, said recipient address list of said at least one message including at least one additional recipient address;
receive a request to display said new message; and
display a notification dialog notifying that said new message includes said difference in recipient addresses, wherein said dialog identifies said additional address.

6. A non-transitory computer readable storage medium containing computer-executable instructions that, when performed by a processing apparatus having a messaging application permitting a user to take actions in relation to messages, cause the processing apparatus to:
receive, from a server, a new message having a list of recipient addresses, said new message identifiable as belonging to a message thread, said message further including an indication that said list of recipient addresses is incomplete;
transmit a request, to said server, for a complete list of recipients;
receive, from said server, said complete list of recipients;
determining that said received complete list of recipients differs from a list of recipient addresses in at least one message in said thread, said recipient address list of said at least one message including at least one additional recipient address;
receive a request to display said new message; and
display a notification dialog notifying that said new message includes said difference in recipient addresses, wherein said dialog identifies said additional address.

7. A changed recipient indication method comprising:
receiving, from a server, a new message having a list of recipient addresses, said new message identifiable as belonging to a message thread, said message further including an indication that said list of recipient addresses is incomplete;
transmitting a request, to said server, for a complete list of recipients;
receiving from said server, said complete list of recipients;
determining that said received complete list of recipients differs from a list of recipient addresses in at least one message in said thread, said recipient address list of said new message including at least one additional recipient address;
receiving a request to display said new message; and
displaying a notification dialog notifying that said new message includes said difference in recipient addresses, wherein said dialog identifies said additional recipient address.

8. The method of claim 7, wherein said at least one message in said thread comprises a most recent prior message in said thread.

* * * * *